United States Patent [19]
Kuchar

[11] 3,845,801
[45] Nov. 5, 1974

[54] HOMOGENIZED PARTICULATE MATTER FOR SPRAY DRYING

[75] Inventor: Paul J. Kuchar, Hinsdale, Ill.

[73] Assignee: Universal Oil Products Company, Des Plaines, Ill.

[22] Filed: Mar. 23, 1973

[21] Appl. No.: 344,293

[52] U.S. Cl................. 159/48 R, 23/305, 159/4 R, 210/258
[51] Int. Cl......... B01d 1/16, F26b 3/12, C01f 7/34, C22b 13/00, C02b
[58] Field of Search............. 159/3, 4 A, 4 B, 4 SR, 159/4 R, 4 CC, 48 R, 4 E, 4 J, 4 K, 4 S, 4 MS, 4 VM, DIG. 10, DIG. 25, 47 R, 45, 2 R, DIG. 24; 23/260, 305, 313, 313 A; 252/359 D; 210/152, 258; 423/328

[56] References Cited
UNITED STATES PATENTS

| | | | |
|---|---|---|---|
| 2,413,330 | 12/1946 | Miller | 159/4 X |
| 2,434,672 | 1/1948 | Pattee | 159/2 R X |
| 2,618,644 | 11/1952 | Bailey | 210/258 X |
| 3,036,626 | 5/1962 | Kopita et al. | 159/4 A |
| 3,074,923 | 1/1963 | Cosby et al. | 159/45 R UX |
| 3,102,062 | 8/1963 | Graham et al. | 159/3 |
| 3,524,820 | 8/1970 | Vesely | 423/328 |

Primary Examiner—Jack Sofer
Attorney, Agent, or Firm—James R. Hoatson, Jr.; Robert W. Erickson; William H. Page, II

[57] ABSTRACT

An aqueous suspension, slurry, or paste of particulate matter, intended for spray drying to produce a substantially moisture-free product, is initially passed across an orifice plate at a pressure drop therethrough of about 300 psig. to about 700 psig.

9 Claims, 1 Drawing Figure

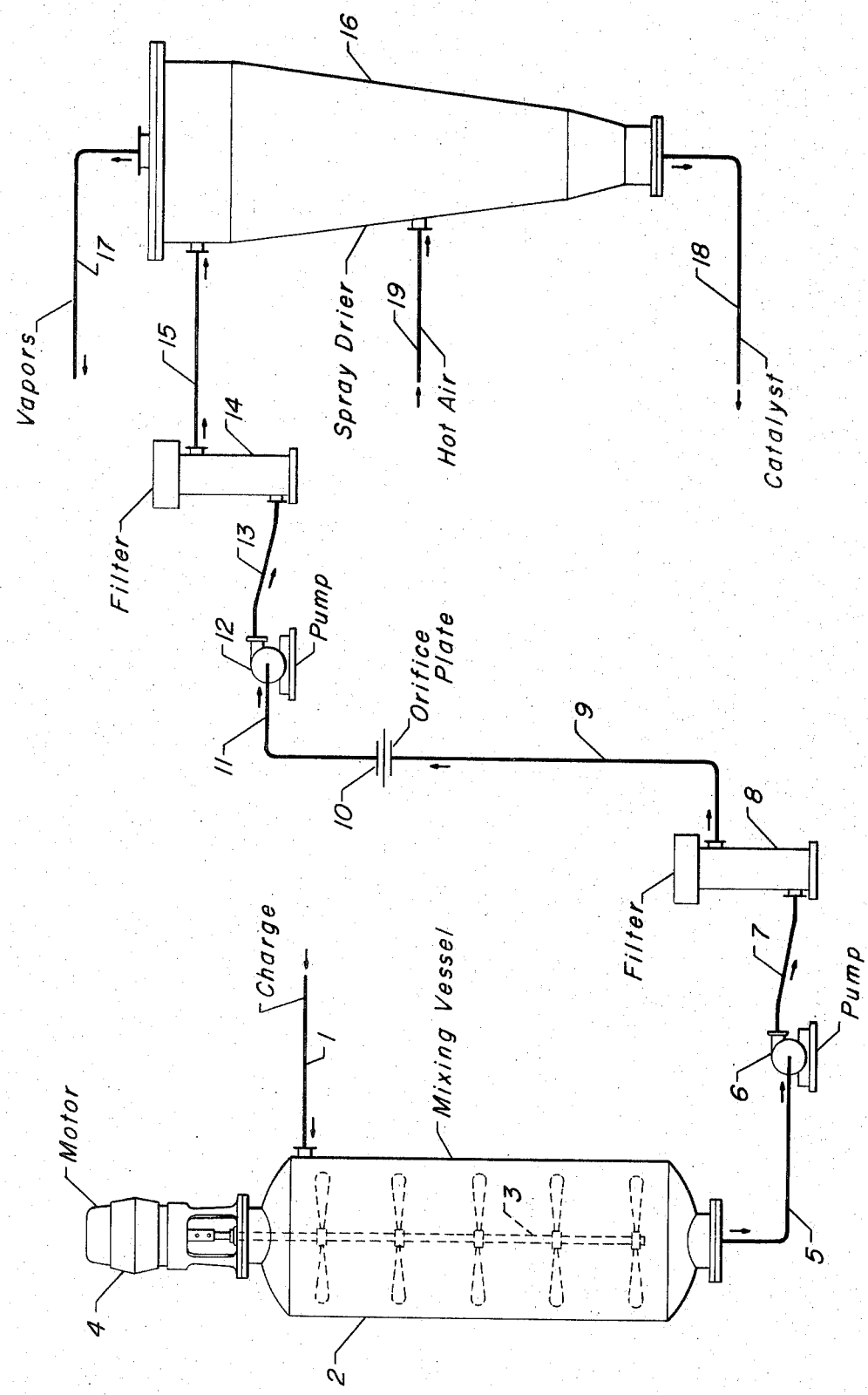

HOMOGENIZED PARTICULATE MATTER FOR SPRAY DRYING

APPLICABILITY OF INVENTION

The invention herein described affords an improvement in the technique of spray drying particulate matter. Spray drying, as such, is a well-documented technique which has long been utilized in a multitude of industries for effecting the rapid evaporation of moisture from particulate matter which, in its finished state, is intended to be substantially free from moisture. Moisture-free material is advantageous from the standpoint of handling, packaging, shipping, ultimate use, etc. Either as an intermediate, or final step, spray drying is employed in a wide variety of industries and in effecting a wide spectrum of processes. Spray driers are employed to dry suspensions, slurries and pastes. As a general proposition, if a material can be pumped, it can be subjected to spray drying. In many instances, high-pressure nozzles, or high-speed disc atomizers, constitute the only feasible means of atomizing the spray drier charge.

Although extensively utilized in the food, agriculture, chemical, petrochemical and petroleum industries, etc., spray drying is particularly applicable to the drying of heat-sensitive materials such as pharmaceuticals. This is principally due to the relatively short contact times as well as to the fact that the liquid drops remain cool when evaporation is taking place in the hot zone of the drier; further, at the point where the particles are no longer wet, the surrounding gases have been cooled by the evaporation process, thereby eliminating additional danger of overheating. Various materials have been successfully subjected to spray drying and include cereals, grains, seed, animal feed, powdered food stuffs — i.e., coffee extract — solid chemicals such as magnesium carbonate, catalysts, etc. My invention is applicable to such industries and the aforementioned products derived therefrom, and affords a significant improvement therein. It is understood that no attempt is herein made to claim the spray drying apparatus in and of itself, nor the well known spray drying process absent the improved technique which is the subject of my inventive concept.

A spray drier creates a highly dispersed semiliquid state in a high-temperature gaseous zone. Operation of a spray drier involves three fundamental aspects: (i) atomization, (ii) spray-gas mixing and (iii) drying of liquid drops. Atomization is generally accomplished through the utilization of high-pressure nozzles and/or high-speed rotating discs. With such atomizers, a pumpable liquid, whether a relatively clear suspension, or thick slurry, can be dispersed into droplets as small as two microns. Spray driers consist essentially of a drying chamber, a source of hot gases — i.e. flue gases, air, nitrogen, etc. — a means of atomizing the charge, and a method of separating the dry product from the exhaust gas. Any particular design, of which there are a multitude, may provide for cooling air to enter around the chamber, closed systems to recover volatile solvents, wet-dust collectors to recover excessively fine dust, air sweepers to remove dry products from within the chamber, etc. Spray driers may operate with countercurrent or cocurrent gas flow and may be heated by oil, gas, coal, indirect steam heaters, or by waste gases from various refining operations.

Inlet gases to a spray drier flow down or up around the atomizer when the latter is a centrifugal disc, combined, in some designs, with flow into the chamber from side inlets. Countercurrent flow is somewhat difficult to use with this type of atomizer because it produces a flat or horizontal spray pattern. With nozzles, the direction of flow may be counter to, or parallel with the spray, or a combination of both.

OBJECTS AND EMBODIMENTS

A principal object of my invention is to afford an improvement in the technique of spray drying particulate matter to produce a substantially moisture-free, dry product. A corollary objective is to produce a substantially uniform, homogenized aqueous slurry, or suspension of particulate matter prior to introducing the same into the spray drier.

As hereinafter set forth in greater detail, a specific object of this invention resides in a spray drying technique for producing catalytic composites having more uniform physical and chemical characteristics.

Therefore, in one embodiment, my invention involves a method for spray drying an aqueous slurry, or suspension of particulate matter which comprises passing said slurry through an orifice at a pressure drop in the range of about 300 psig. to about 700 psig., increasing the pressure of the resulting homogenized slurry, and introducing the same into a spray drier at the elevated pressure.

In a specific embodiment, the present invention is directed toward a method for spray drying an aqueous slurry, or suspension of a mixture of alumina and silica which comprises passing said slurry, at a pressure of about 330 psig. to about 800 psig., through an orifice having a diameter in the range of about 0.025 inch to about 0.055 inch, the pressure drop across said orifice being from 300 psig. to about 700 psig., introducing the resulting homogenized slurry into a spray drier at an increased pressure in the range of about 40 psig. to about 400 psig., and therein contacting a gaseous drying agent at a temperature in the range of about 400°F. to about 1,200°F.

Other objects and embodiments will become evident from the following more detailed description of the present invention. Such other embodiments are generally directed toward preferred processing techniques and operating conditions. In one such other embodiment, the slurry of particulate matter is passed through a suitable filter both downstream and upstream of the orifice plate.

SUMMARY OF INVENTION

The present invention involves the integration of a charge homogenizing system with a spray drying system of the type hereinbefore described. The most advantageous result, stemming from this inventive concept is the enhanced quality of the charge to the spray drier, and, therefore, the significantly improved quality of the dried product. Although product quality, particularly with respect to uniformity of physical and/or chemical characteristics, is important in many of the industries previously set forth, it is virtually essential in both the pharmaceutical and petroleum industries. In the interest of brevity, and not with the intent of unduly limiting the present invention, the scope and spirit of which is defined by the appended claims, the following discussion will be principally directed toward the technique of spray drying particulate matter intended for utilization in the petroleum industry as an adsorbent, catalyst, or porous carrier material for various catalytically active metallic components.

Metallic compounds, generally classified as refractory inorganic oxides, have enjoyed widespread use throughout the petroleum insustry. Initially, this refractory material was obtained by refining a variety of naturally occurring substances such as clay, kieselguhr, feldspar, etc. Many refractory inorganic oxides are in use, serving a wide spectrum of purposes, including alumina, silica, zirconia, strontia, magnesia, boria, calcium oxide, etc. As technology advanced, methods were devised to produce synthetic material of significantly improved quality as compared to the naturally occurring substances. With the improvement in quality, there arose a multitude of new uses, as well as refined techniques respecting old uses.

Refractory inorganic oxides, in spray-dried form, particularly alumina and silica, and mixtures thereof, are extensively utilized as adsorbents, catalyst and porous carrier materials. For example, silica is employed as a drying agent to remove water from various gaseous streams, while alumina serves to adsorb various chemical contaminants from liquid streams — i.e., alkyl fluorides from the alkylate product of an alkylation reaction system. Mixtures of alumina and silica, particularly that group having the characteristics of being zeolitic crystalline aluminosilicates, are similarly utilized. Whether amorphous, or zeolitic, alumina, silica and mixtures thereof also serve as the porous carrier for active metallic components in the formulation of multifarious conversion catalysts. In some conversion systems, the material serves as the catalyst without the addition of metallic components — i.e. fluid catalytic cracking. Regardless of its intended use, and whether amorphous, or zeolitic, the material can be significantly improved through the utilization of my invention.

As an illustration, the present invention will be described with respect to the preparation of particulate matter consisting of a crystalline aluminosilicate which is dispersed within a silica matrix. Such a material can be utilized as a conversion catalyst in and of itself, or combined with one or more active metallic components. In so describing my invention, reference will be made to the accompanying drawing which is herein contained for the sole purpose of illustrating one embodiment. In the drawing, presented as a simplified flow diagram, various details such as instrumentation and controls, start-up lines, valves and other manifolding have been eliminated as being non-essential to an understanding of the techniques which are involved. The use of such miscellaneous appurtenances, to modify the process as illustrated, is well within the purview of those having the requisite skill in the art. Prior to describing the drawing in detail, it is believed that a description of the method of preparing the spray drier charge, entering mixing tank 2 via line 1 is warranted.

SPRAY DRIER CHARGE PREPARATION

The method herein described is specifically directed towards the preparation of a crystalline aluminosilicate, or zeolitic material, which is dispersed within a silica matrix. In and of itself, the final product provides an improved catalyst, particularly with respect to the fluid catalytic cracking of petroleum hydrocarbons.

The crystalline aluminosilicate may be prepared in any conventional, or otherwise convenient manner. One commonly preferred method comprises forming an aqueous solution of an alkaline metal aluminate and an alkali metal hydroxide, and commingling the same with an aqueous silica slurry. The alkali metal hydroxide is usually sodium hydroxide, while the alkali metal aluminate is usually sodium aluminate, having a sodium oxide/alumina molar ratio of about 1.2:1.0. The resulting reaction mixture preferably has a sodium oxide/silica molar ratio of at least about 0.3 and a silica/alumina molar ratio of about 6 to about 20, and sufficient to yield a crystalline aluminosilicate product characterized by a silica/alumina molar ratio of at least about 3.0:1.0. The crystalline aluminosilicate is precipitated from the reaction mixture at a temperature from about 65°F. to about 245°F., and thereafter subjected to a cold age, at a temperature up to about 100°F., for a period of about 1 hour to about 25 hours. Following the cold age, the reaction mixture is heated to effect substantially complete precipitation of the crystalline aluminosilicate from its mother liquor.

A silica sol is prepared by the acidification of an alkali metal silicate solution. An aqueous sodium silicate solution, commercially available as water glass, is most commonly employed. Acidification with a suitable acid, such as hydrochloric acid, effects hydrolysis of the water glass and the conversion thereof to silicic acid or a silica sol. The water glass is generally diluted with water and added to the acid in the diluted state, the final pH being at least about 2.5, and not in excess of 4.5. To inhibit polymerization and premature gellation, the temperature is maintained below about 100°F.

The crystalline aluminosilicate/mother liquor mixture is cooled and added to the silica sol in an amount to insure a final catalytic composite comprising about 1.0 percent to about 60.0 percent by weight of crystalline aluminosilicate dispersed within an amorphous silica matrix. It is preferred to add the mixture to an acidic sodium silicate solution having a pH in the range of about 2.5 to about 3.5, such that the final pH of the resulting mixture is in the range of about 4.0 to about 4.5. By an alternative method, the acidic sodium silicate may be prepared with an initial pH of about 3.5 to about 4.5, and the pH controlled to not exceed 4.5 by adding a suitable acid separately, but concurrently with the highly alkaline crystalline aluminosilicate/mother liquor mixture. The reaction mixture or product, resulting from the commingling of the crystalline aluminosilicate/mother liquor with the silica sol, is aged in contact with an ion-exchange solution comprising hydrogen ions for a period of, at least, about ½ hour, while maintaining the reaction mixture at a pH in the range of about 3.5 to about 4.0, during which time gellation may occur. After the reaction mixture has been permitted to age at these acidic conditions, preferably under rapid and continuous stirring, and gellation has been effected, the resulting slurry or suspension has the pH adjusted to about 6 to about 7. The reaction mixture is thereafter aged for a time sufficient to develop optimum pore structure characteristics, and for a period of about 0.5 to about 3 hours. This last aging step is conveniently referred to as a basic age in contrast to the first-mentioned acidic age. It is the basic age material which constitutes the spray drier charge.

DESCRIPTION OF DRAWING

The basic age gellation charge enters the process through line 1, in admixture with water, and is introduced into mixing vessel 2 having suitable mixing means 3 generally powered by motor 4. In accordance with currently practiced spray drying techniques, the reslurried mixture, or suspension, would be introduced directly into the spray drier for contact therein with hot air at a temperature in the range of about 400°F. to about 1,200°F. Such a system inherently possesses two disadvantages of significant proportions. First, the gellation charge is insufficiently mixed to the extent that non-uniformity exists therein, as well as in the ultimate spray dried product. Secondly, such mixing is notoriously incapable of preventing relatively minor quantities of large agglomerates from plugging the spray drier feed nozzles.

In accordance with the present invention, the basic aged gellation product is reslurried with water in mixing vessel 2, to a relatively smooth consistency, and passes via line 5 into the suction side of pump 6. Pump 6 discharges the material through line 7 at a pressure of about 330 psig. to about 800 psig., for introduction therethrough into filter 8. Although shown as a single filtering system, filter 8 may comprise two or more filters with suitable piping and valving such that one filter may be periodically back-flushed while the spray drier charge is being processed through the second filter. In any event, the filtered material is removed through line 9 and forced through orifice plate 10 having a nominal diameter of about 0.025 inch to about 0.055 inch, to effect a pressure drop of about 300 psig. to about 700 psig. Thus, the pressure on the downstream side of orifice plate 10, being exit line 11, is in the range of about 30 psig. to about 100 psig. Homogenization of the spray drier charge is effected as a result of the severe pressure drop across orifice plate 10.

The more uniform charge in line 11 is raised to an elevated pressure in the range of about 40 psig. to about 400 psig. by way of pump 12, and exits therefrom via line 13 into another filter system 14. While not essential to the method of the present invention, filter 14 affords additional insurance with respect to the plugging of the spray drier feed nozzle. In a preferred embodiment, the pressure of the spray drier charge in line 15 is within the range of about 200 psig. to about 300 psig., and is introduced thereby into spray drier 16. Hot air at a temperature of about 400°F. to about 1,200°F., and preferably from about 650°F. to about 1,200°F. is introduced via line 19 wherein it countercurrently contacts descending moist particles. Excess air and water vapor, removed from the particulate matter, are withdrawn by way of line 17, while substantially dry, finely divided particles of the crystalline aluminosilicate, dispersed within a silica matrix, are removed by way of line 18.

The advantages of the foregoing-described spray drying process include a lessening of the probability of plugging the spray drier nozzle due to foreign material and large agglomerates in the spray drier charge. Further, the spray drier charge is introduced to a spray drier charge pump at a positive, constant pressure level. More importantly, the spray drier feed is homogenized and results in spray dried particles of uniform physical and chemical characteristics. The latter is extremely important with respect to the preparation of conversion catalyst.

I claim as my invention:

1. A method for spray drying an aqueous slurry or suspension of a refractory inorganic oxide which comprises passing said slurry or suspension through an orifice at a pressure drop in the range of about 300 psig. to about 700 psig., increasing the pressure of the resulting homogenized slurry or suspension, and introducing the same into a spray drier at the elevated pressure.

2. The method of claim 1 further characterized in that said homogenized slurry or suspension is introduced into said spray drier at a pressure of from about 40 psig. to about 400 psig., and therein contacts a gaseous drying agent at a temperature in the range of about 400°F. to about 1,200°F.

3. The method of claim 1 further characterized in that said slurry or suspension passes through a filter both downstream and upstream of said orifice.

4. The method of claim 1 further characterized in that the pressure on the downstream side of said orifice is in the range of about 30 psig. to about 100 psig.

5. The method of claim 1 further characterized in that said refractory inorganic oxide is a mixture of alumina and silica.

6. A method for spray drying an aqueous slurry, or suspension of a mixture of alumina and silica which comprises passing said slurry or suspension, at a pressure of about 330 psig. to about 800 psig., through an orifice having a diameter in the range of about 0.025 inch to about 0.055 inch, the pressure drop across said orifice being from 300 psig. to about 700 psig., and introducing the resulting homogenized slurry or suspension into a spray drier at an increased pressure in the range of about 40 psig. to about 400 psig., and therein contacting a gaseous drying agent at a temperature in the range of 400°F. to about 1,200°F.

7. The method of claim 6 further characterized in that said mixture is a crystalline aluminosilicate.

8. The method of claim 6 further characterized in that said mixture is amorphous.

9. The method of claim 6 further characterized in that said mixture is a crystalline aluminosilicate dispersed within an amorphous matrix.

* * * * *